United States Patent [19]

Cook

[11] Patent Number: 4,700,750
[45] Date of Patent: Oct. 20, 1987

[54] HYDROCARBON FLOW RATE REGULATOR

[75] Inventor: John E. Cook, Chatham, Canada

[73] Assignee: Bendix Engine Components Limited, Chatham, Canada

[21] Appl. No.: 793,380

[22] Filed: Oct. 31, 1985

[51] Int. Cl.$^4$ .............................................. E15D 1/02
[52] U.S. Cl. ..................................... 138/46; 123/518
[58] Field of Search ..................... 55/18, 19, 212, 417; 73/1 G, 23; 123/518, 519, 520, 521; 138/39, 41, 43, 45, 46, 89; 210/143, 739, 908, 922; 137/2, 8, 9, 88, 92, 93, 197, 199, 479

[56] References Cited

U.S. PATENT DOCUMENTS

| | | | |
|---|---|---|---|
| 1,098,275 | 5/1914 | Leuthesser | 137/197 X |
| 2,319,498 | 5/1943 | Gerard | 138/45 X |
| 2,817,350 | 12/1957 | Bradner et al. | 73/23 X |
| 2,823,694 | 2/1958 | Champion | 137/197 |
| 2,830,621 | 4/1958 | Prescott | 138/46 |
| 4,173,207 | 11/1979 | Hiramatsu | 123/519 |
| 4,175,527 | 11/1979 | Sanada et al. | 123/518 X |

Primary Examiner—Charles E. Phillips
Assistant Examiner—Mark J. Thronson
Attorney, Agent, or Firm—Markell Seitzman; Russel C. Wells

[57] ABSTRACT

A hydrocarbon vapor recovery storage system including a charcoal canister for storing hydrocarbon vapor and a control valve for establishing the rate of flow of the vapor into the intake manifold of an engine. The system further includes a regulator (30) comprising an inlet passage (52,54) for receiving the vapor from the canister and an outlet passage for communicating the vapor to the control valve (22). The regulator further includes a device for regulating the maximum flow rate of the vapor comprising a piston (120) movable relative to a control orifice (64) to regulate the flow therethrough. The piston (120) is movable by a material, such as a silicon rubber compound that is capable of changing its physical size in accordance with the concentration of hydrocarbons in the vapor communicated thereto.

18 Claims, 6 Drawing Figures

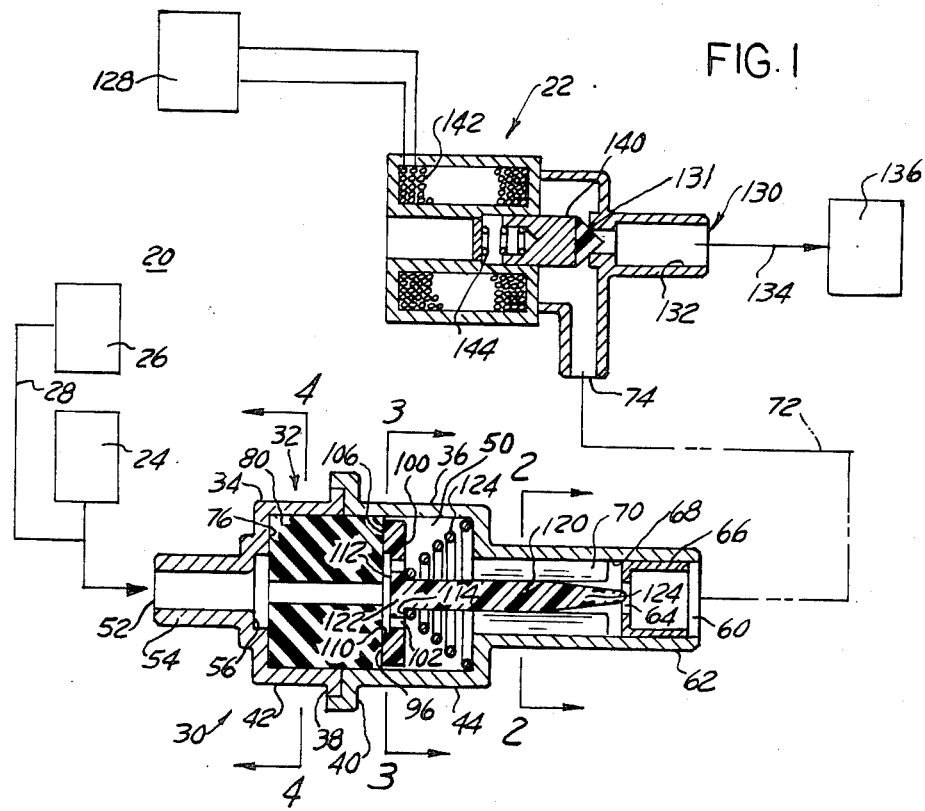
FIG. 1
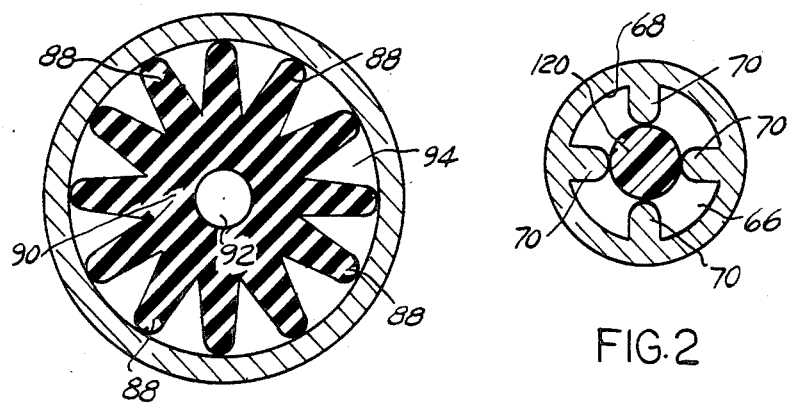
FIG. 4
FIG. 2

HYDROCARBON FLOW RATE REGULATOR

BACKGROUND AND SUMMARY OF THE INVENTION

The present invention is directd to a flow regulator which reacts to the concentration of hydrocarbons in a vapor to control the flow rate of the vapor as it passes therethrough. More specifically, the invention is directed to a concentration sensor or flow regulator which incorporates therein a material which expands or contracts in accordance with the concentration of hydrocarbons to control the rate at which gasoline vapor containing hydrocarbons may be removed from a storage or evaporation canister and returned to the intake manifold of an engine.

In order to control the emission of residual hydrocarbon vapors within the intake manifold of an engine or within the fuel tank, charcoal canisters have been incorporated within the pollution control system of internal combustion engines for storing these vapors. When the engine is restarted a control device such as a control solenoid may be used to regulate the rate of flow purge air from the canister into the intake manifold. The control solenoid or similar device is typically vacuum responsive and during idle or under light engine load, when there exists a large degree of engine vacuum, the hydrocarbons may be returned at a substantial concentration to the engine. During light engine load conditions there may be a surge in hydrocarbons in the exhaust if the canister is saturated. Typically, an open loop control is used to regulate the flow rate of canister purge air to the intake manifold which is varied with engine load and speed but not in proportion to the amount of hydrocarbons stored within the canister. Consequently, it can be seen that, as used in the prior art, if the rate is modified based only on engine load and speed without the knowledge of the degree of hydrocarbon concentration within the canister, a surge in hydrocarbons in the exhaust may occurr. In addition, since many fuel management systems are closed loop systems that incorporate an oxygen sensor in the exhaust system the surge inhydrocarbons caused by the intake of hydrocarbons from the evaporation canister could cause the engine management system to reduce the amount of fuel going to the fuel injectors of the engine which would cause the engine to misfire or otherwise run rough. One solution to obtaining information regarding the saturation of the charcoal canister or of the concentration of hydrocarbons in the vapor flowing therefrom is to incorporate within the pollution control system a sensor which monitors the concentration of hydrocarbons and thereafter generates a signal which is received by the electronic control unit within the fuel management system to modify the rate at which fuel is ingested into the engine in view of these additional hydrocarbons released into the intake manifold. Such a system, while enabling a closed loop control system to compensate for hydrocarbon flow is invariably expensive and complicated. The present invention provides for a simple and reliable solution to the above deficiencies in the art.

It is an object of the present invention to provide a concentration sensor which varies its physical characteristics in accordance with the concentration of hydrocarbons within a vapor to regulate the flow rate of the vapor accordingly. More specifically, it has been found that when silicone rubber is exposed to gasoline vapor the silicone rubber will expand in accordance with the concentration of hydrocarbons.

Accordingly, the present invention comprises: A flow regulator or sensor for restricting the flow of vapors therethrough in accordance with the concentration of hydrocarbons in the vapor. The regulator comprises a housing comprising cojoined a first and second housing members cooperating to define a chamber. The first housing member includes inlet passage means for communicating vapor thereto, and the second housing member includes outlet passage means for the vapor to flow out from the housing. The regulator further includes a body of hydrocarbon sensitive material partially filling the chamber, the material being capable of expanding and contracting in proportion to the concentration of hydrocarbons in the vapor communicated thereto. The material includes at least one flow passage, in communication with the passage means, through which the vapor may flow, support means in contact with an exposed end of the material including at least one opening therethrough in communication with the at least one flow passage, and movable with the material, a control orifice positioned within the housing, and piston means supported at one end by the support means and movable therewith and including another end cooperating with said orifice to regulate the flow area through the control orifice in proportion to the movement of the material.

Many other objects, advantages and purposes of the invention will be clear from the following detailed description of the drawings.

BRIEF DESCRIPTION OF THE DRAWINGS

In the drawings:

FIG. 1 illustrates a cross-section of a system for regulating hydrocarbon flow rate.

FIG. 2 illustrates a sectional view of a concentration sensor or flow regulator taken through section 2—2 of FIG. 1.

FIG. 4 is a cross-sectional view through section 4—4 of FIG. 1.

DETAILED DESCRIPTION OF THE DRAWINGS

Figure 3:
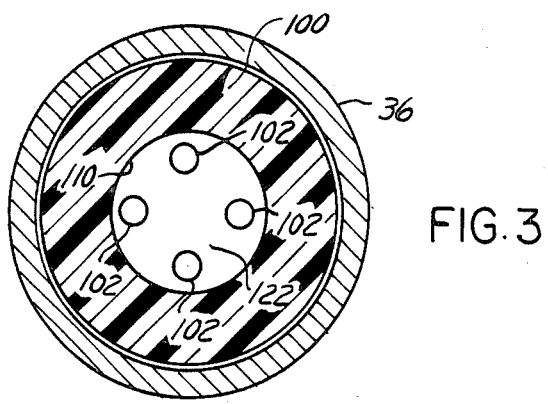
FIG. 3 illustrates yet another cross-sectional view taken through section 3—3 of FIG. 1.

FIG. 1 illustrates a system 20 for regulating the flow rate of hydrocarbons from a charcoal or storage canister 24 or fuel tank 26 of a known variety. The system includes a control solenoid generally designated as 22 and a concentration sensor or flow regulator generally designated as 30. The concentration sensor 30 comprises a housing 32 formed by a first housing member 34 and a second housing member 36. Each of the housing members 34 and 36, respectively, are generally hollow members that are attached at cojoining radial flanges 38 and 40. The flange 38 extends from a cylindrical wall 42 while flange 40 extends from a cylindrical wall 44. Upon assembly the walls 42 and 44 define an actuation chamber generally designated as 50. The first housing member further includes an inlet port 52 formed in a narrow passage or walled member 54 which extends into the chamber 50. The passage 52 terminates in an enlarged bore 56 proximate the chamber 50. The inlet port 52 is adapted to communicate with the charcoal canister 24 and with a fuel tank vent line 28 in a known manner. The second housing member 36 further includes an outlet port 60 formed within a narrow walled element 62 which extends from the cylindrical wall 44. Positioned within the interior of the narrow walled member 62 is a control orifice 64 preferably formed as a metal stamping generally shown as 66 or the like. The stamping 66 is secured to the inner wall 68 of the member 62. The stamping 66 may be moved laterally for calibrating the flow rate therethrough. Positioned upstream of the control orifice 64 are a plurality of piston guides 70 which extend from the inner wall 68. The piston guides are more clearly shown in FIG. 2. The outlet port 60 of the concentration sensor 30 is communicated by vacuum lines 72 to the inlet port 74 of the control solenoid 22.

Loosely received relative to the walls 42 and 44 of the chamber 50 and optionally secured to a shoulder 76 situated between the narrow walled member 54 and the cylindrical wall 42 is a premolded insert of a material 80 which, in the presence of hydrocarbons, reacts to or senses the concentration of hydrocarbons communicated thereto and varies its volume, shape or density accordingly. Such sensing means may comprise the premolded insert of siliconized rubber. In the preferred embodiment of the invention the premolded material 80, as more particurlarly illustrated in the cross-sectional view of FIG. 4, comprises a plurality of radially extending fingers 88 which extend from a central hub 90. The hub 90 defines a passage 92. Hydrocarbons received at the inlet port are communicated to the enlarged bore 56 formed within the element 54 and are communicated through the insert or material 80 via the passages 94 formed between adjacent fingers 88 and through the central passage 92. Preferably, through not necessarily positioned downstream of the insert 80, in mating engagement with an end 96 thereof is a washer-like member 100. As will be seen below, the member 100 serves as a means for supporting a piston 120. The member 100 is slidably received relative to the interior of the chamber 50 and includes a plurality of passages or openings therethrough. These openings are more clearly illustrated in FIG. 3. The upstream wall 106 of the member 100 includes a counter-bore 110 of sufficient size to permit vapor flow from the various passages 92 and 94 within the insert 80 to communicate with the passages or openings 102 formed within the member 100. The member 100 further includes a stepped bore 112 defining a shoulder 114. A piston 120 is received within the stepped bore and includes an enlarged end 122 which sets upon the shoulder 114. The piston extends through the chamber 50 and into the passage 68. The piston 120 is axially guided relative to the control orifice 64 by the aforementioned guides 70. The downstream end 124 of the piston 120 is preferably tapered such that as the piston 120 moves axially relative to the control orifice 64 the flow area of the control orifice is varied. While the washer-like member 100 and piston 120 have been described as separate parts, it is preferable to fabricate them as a unitary, one-piece member which may be formed by injection molding or the like.

The concentration sensor 30 may further include a spring 124 which is received within the chamber 50 for biasing the member 100, piston 120 and deformable material 80 in a direction thereby urging the tapered end 124 of the piston 120 away from the control orifice 64.

As previously mentioned, the outlet port 60 of the concentration canister 30 is communicated to the inlet port 74 of the control solenoid 22. The control solenoid further varies the maximum flow rate of the vapor as established by the concentration sensor 30 in response to electric signals generated from an electronic control unit 128. The control solenoid can be one such as disclosed in the commonly assigned patent application Ser. No. 664,915, which is incorporated by reference. The control solenoid further includes an outlet port 130 which is communicated by appropriate vacuum lines 134 to the intake manifold 136 of an engine. The outlet port is lodged within an outlet passage 132 which terminates at a valve seat 131. A movable valve element 140 is reciprocatively positioned relative to the valve seat 131 and is movable relative thereto in response to magnetic signals generated by the coil 142. The control solenoid 22 may further be provided with a bias spring 144 which urges the valve element 140 into closure with the valve seat 131. The duty cycle of the control solenoid may be varied in accordance with many control philosophies, such as a pulse-width modulated signal which is communicated to the coil 142 to change the duty cycle of the control solenoid in accordance with engine operating parameters. As an example, the duty cycle under light engine load or low speed conditions characterized by high engine vacuum, may be set relatively low to restrict vapour flow rate and prevent surges in hydrocarbons to the intake manifold.

The siliconized rubber material or insert 80 or analogous material which is capable of changing its volume, size or density in response to the concentration of hydrocarbon vapors communicated thereto will achieve a first or nominal condition or size under conditions involving a zero concentration of hydrocarbons within the vapor. In this condition the spring 124 biases the piston 120 to achieve a first position relative to the control orifice 64 thereby permitting nominal air or vapor flow therethrough. As previously mentioned, control orifice 64 may be moved laterally during manufacture for calibration purposes. As hydrocarbons are removed from the canister 24 or fuel tank vent line 26 in response to engine vacuum communicated through the control solenoid 22 and to the outlet port 60 of the concentration sensor 30, the size of the material 80 will change. As an example, as the concentration of hydrocarbons within the air or vapor increases the insert 80 will expand thereby urging the member 100 and piston 120 to the right as viewed in FIG. 1 thereby restricting the flow area of the control orifice 64 and hence regulating the maximum allowable flow rate as the tapered end 124 of the piston 120 is received therein. As the hydrocarbon concentration within the gas or vapor further increases the siliconized rubber insert 80 increases in size to urge the piston 120 in an upstream direction to lessen maximum hydrocarbon flow. The tapered end 124, position and length of the piston 120 may be chosen such that even under maximum hydrocarbon concentration a predetermined flow area is present, that is, the control orifice and piston 124 are sized such that the control orifice 64 is never fully closed by the piston 120. Further, as the level of hydrocarbon concentration within the gas or vapor flowing through the insert 80 is reduced the size of the insert 80 similarly reduces. Under this condition the spring 124 urges the member 100 and the piston 120 to the left as viewed in FIG. 1 thereby increasing the maximum available vapor or air flow rate. As can be seen from the above the spring 124 may be eliminated from the present invention by bonding the member 100 directly to the insert 80 thereby changes in the size of the insert 80 will directly move the piston 120 relative to the control orifice 64.

As can be seen from the above, the concentration sensor 30 regulates the maximum allowable vapor or air flow rate in accordance with the concentration of hydrocarbons within the air or vapor. This maximum allowable flow rate may further be modified by the control solenoid 22 prior to introduction of the air or vapor into the intake manifold 136 of the engine. In this manner, the overall rate at which hydrocarbons are reintroduced into the intake manifold 136 is controlled.

Figure 5:
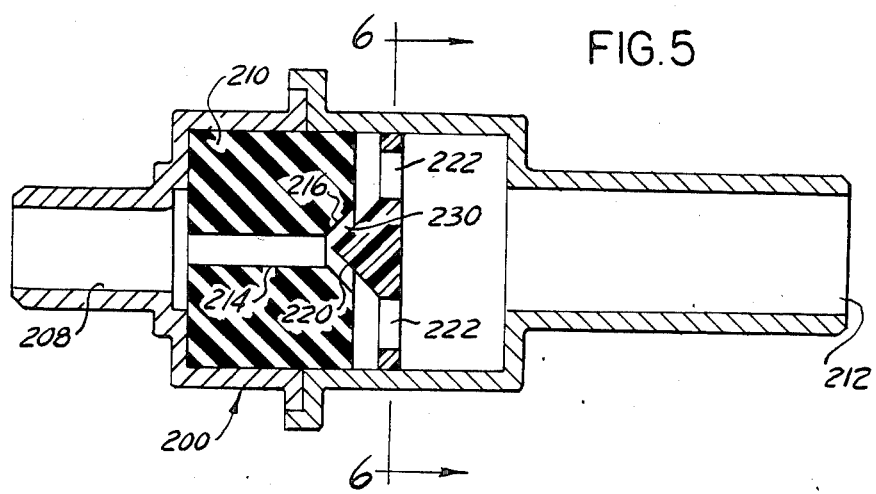
FIGS. 5 and 6 illustrate an alternate embodiment of the invention.
Figure 6:
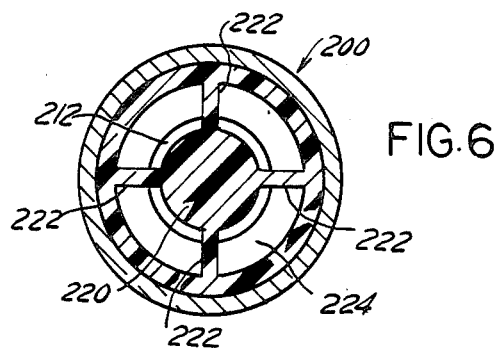

Reference is briefly made to FIGS. 5 and 6 which illustrate an alternate embodiment of the invention. There is illustrated a housing 200 which supports an inlet passage 208 adapted to receive the air or vapor flow and an outlet passage 212 adapted to communicate to the inlet port 74 of the control solenoid 22. A siliconized rubber insert or member 210 is received within the housing and includes a central passage 214 therethrough. The downstream end of the passage 214 may be formed with a counter-bore 216 positioned coaxial to the passage 212. Axially positioned relative to the counter-bore 216 is a tapered, stationary element 220. The tapered element 220 is suspended relative to the housing 200 and outlet passage 212 by a plurality of webs or ribs 222. The open area 224 between adjacent ribs 220 provides a flow means to permit the air or vapor to flow past the tapered element and into the outlet passage 212. As can be seen from the above, the alternate embodiment of the invention eliminates the spring 124 and the movable piston 120 and its guides 70. In operation as the hydrocarbon concentration of the vapor or air varies the size of the insert 210 varies thereby changing the available flow area generally designated as 230 between the counter-bore 214 and the member 220 thereby changing the maximum available flow in proportion to the concentration of hydrocarbons within the air or vapor passing through the member 210.

Many changes and modifications in the above described embodiment of the invention can, of course, be carried out without departing from the scope thereof. Accordingly, that scope is intended to be limited only by the scope of the appended claims.

I claim:

1. A device for regulating the flow of vapors in accordance with the concentration of hydrocarbons in the vapor comprising:
    a housing comprising cojoined first and second housing members, said housing members cooperating to define a chamber, said first housing member including inlet passage means for communicating vapor thereto, and said second housing member including outlet passage means for said vapor to flow out from said housing,
    hydrocarbon sensitive material partially filling said chamber, said material capable of expanding and contracting in proportion to the concentration of hydrocarbons in said vapor communicated thereto, said material including at least one flow passage in communication with said inlet passage means, through which said vapor may flow,
    support means in contact with said material including at least one opening therethrough in communication with said at least one flow passage, and movable with said material,
    a control orifice positioned within said housing,
    piston means supported at one end by said support means and movable therewith and including another end cooperating with said orifice to regulate the flow area through said control orifice in proportion to the movement of said material.

2. The device as defince in claim 1 wherein the outer shape of said material conforms to the cross-section of said chamber, and wherein said material comprises a hub, a plurality of fingers radially extending therefrom, a central passage through said hub and wherein the spaces between adjacent fingers provide additional flow passages through said material in communication with said passage means.

3. The device as defined in claim 2 wherein said material is silicon rubber.

4. The device as defined in claim 2 wherein said material is positioned on one side of said chamber and includes an exposed end and wherein said support means comprises an annular member in abutting relation with said exposed end and wherein said annular member includes a plurality of openings in communication with the said additional flow passages; a central opening and support shoulder thereabout for supporting said one end of said piston, said piston including a tapered end receivable within said control orifice for varying the flow area therethrough.

5. The device as defined in claim 4 wherein said support means and said piston are of unitary construction.

6. The device as defined in claim 4 wherein said material is positioned upstream of said support means and wherein said control orifice is located downstream of said support means within said outlet passage means.

7. The device as defined in claim 6 wherein said piston partially extends through said outlet passage and is centered relative to said control orifice by guide means extending from the interior walls of said outlet passage.

8. A hydrocarbon vapor recovery storage system including:
    means for storing hydrocarbon vapor;
    flow rate regulating means comprising:
        sensing means in communication with said vapor, for reacting to the concentration of hydrocarbon in said vapor wherein said sensing means is capable of changing its physical size in accordance with the concentration of hydrocarbons in said vapor communicated thereto,
        flow area changing means movable with said sensing means to establish a variable flow area, thereby limiting the flow therethrough; and
    control means, for establishing the rate of flow of the vapor into the intake manifold of an engine by modulating said flow established by said flow area changing means.

9. The system as defined in claim 8 wherein said flow area changing means comprises a control orifice located within the vapor flow and a piston situated between said control orifice and said sensing means and movable relative to the control orifice in response to the changes in the size of said sensing means for cooperating with said orifice to establish a flow area through said orifice proportional to the hydrocarbon concentration within said vapor.

10. The system as defined in claim 9 wherein said sensing means comprises an insert of silicon rubber which includes a plurality of flow passages therethrough.

11. The system as defined in claim 10 wherein said flow area changing means further includes piston support means in contact with said sensing means for supporting said piston, and for moving said piston relative to said orifice, said piston support means including at least one opening therethrough in communication with a passage formed in said sensing means for permitting said vapor to flow thereacross.

12. The system as defined in claim 9 wherein said sensing means includes a body of hydrocarbon reactive material capable of changing its physical size in accordance with the concentration of hydrocarbons communicated thereto.

13. A flow regulator or sensor for restricting the flow of vapors therethrough in accordance with the concentration of hydrocarbons in the vapor comprising hydrocarbon sensitive material capable of expanding and contracting in accordance with the concentration of hydrocarbons in said vapor communicated thereto, said material including at least one flow passage through which said vapor may flow;

a control orifice in communication with said one flow passage;

piston means, movable with said material including an end cooperating with said control orifice to regulate the flow area through said control orifice in proportion to the movement of said material.

14. The device as defined in claim 13 wherein said material comprises a hub, a plurality of fingers radially extending about said one flow passage wherein the spaces between adjacent fingers provide additional flow passages through said material.

15. The device as defined in claim 14 wherein said material is silicon rubber.

16. The device as defined in claim 15 wherein said piston means includes support means comprising an annular member in abutting relation with said material and further includes an annular member comprising a plurality of openings in communication with the said additional flow passages and a central opening in communication with said one flow passage.

17. The device as defined in claim 16 wherein said piston means includes a piston comprising a tapered end receivable within said control orifice for varying the flow area therethrough.

18. The device as defined in claim 17 wherein said material is positioned upstream of said support means and wherein said control orifice is located downstream of said support means.

* * * * *